June 30, 1964 E. RASMANIS ETAL 3,139,600

VARIABLE VOLTAGE GENERATOR

Filed Dec. 12, 1960 2 Sheets-Sheet 1

INVENTORS
EGONS RASMANIS
BY GERALD J. SELVIN

Spencer E. Olson
ATTORNEY

*INVENTOR.*
EGONS RASMANIS
*BY* GERALD J. SELVIN
Spencer E. Olson
ATTORNEY 3,139,600

VARIABLE VOLTAGE GENERATOR

Egons Rasmanis, Burlington, and Gerald J. Selvin, Wayland, Mass., assignors to Sylvania Electric Products Inc., a corporation of Delaware Filed Dec. 12, 1960, Ser. No. 75,409
11 Claims. (Cl. 338—32)

This invention relates generally to voltage generating devices and more particularly to a variable Hall voltage generator.

With the use of microelectronic circuitry becoming more common, a need has been developed for a simple, small, reliable, and inexpensive variable voltage source for use with such circuitry. In the deevlopment of the microelectronics art thus far, it is becoming more and more evident that future electronic circuits will not be specified in terms of the performance of its component parts, but, instead, circuit capabilities will be characterized in terms of "functions." With the development taking this direction, a number of molecular effects have been employed, and others no doubt will be discovered, for incorporation in such circuitry. Although the elements of microelectronic circuits take forms which have little resemblance to conventional circuit components, microelectronic circuitry nonetheless requires voltage control just as much as conventional circuits. For example, frequency control in microcircuitry is best achieved by means of voltage variable capacitor diodes, the capacitance of which is controlled by varying the impressed voltage. This element, then, affords a means for frequency control without requiring access to a rotatable shaft or other device for adjusting the frequency. However, for the voltage variable capacitor diode to be practical in a microelectronic circuit, a source of variable voltage of a size comparable to that of the microelectronic circuit with which it is to be used, and of comparable reliability is required. Presently available potentiometers are considerably larger than microelectronic circuit modules, and voltage control is achieved by a mechanical wiping contact to vary resistance. The mechanical aspects of the potentiometer reduces its reliability, and hence the reliability of the circuit with which it is used, and the size alone limits its usefulness in microelectronics.

It is, therefore, an object of the present invention to provide an improved variable voltage generator of a size suitable for microelectronic applications.

A further object of this invention is to provide a variable voltage source in which voltage control is obtained by "molecular change" in a solid state material, so as to be compatible with circuit elements employed in microelectronic circuit modules.

Another object of the invention is to provide a variable voltage generator having the foregoing characteristics in which the material affording the voltage control is hermetically sealed to achieve high reliability.

Still another object of the invention is to provide a variable voltage generator capable of delivering voltages of a magnitude encountered in semiconductor circuitry.

Still another object of the invention is to provide a variable voltage source comparable in size to other elements of a microelectronic module to permit its incorporation in, and convenient interconnection with, other circuit stages in a microelectronic module.

Still another object of the invention is to provide a variable voltage generator which may be readily controlled externally of an hermetically sealed microelectronic module without disturbing the hermetic seal of the electronic material which affords the voltage control.

These and other objects are attained, in accordance with the invention, by the utilization of the Hall effect and a variable magnetic field. The Hall effect, discovered in 1879, has to do with the creation of an electric field in a solid when a current flows through it in the presence of a magnetic field. The electric field created is manifested as a voltage, usually referred to as the "Hall voltage," the magnitude of which depends on the vector cross-product of the current flow, the magnetic field and other factors. When a sample of semiconductor material is properly oriented in a magnetic field, and current is passed through it in a direction perpendicular to the magnetic field, the voltage developed may be expressed as:

$$V_H = kIB \sin \theta$$

where $k$ is a material constant, I is the current passing through the sample, B is the flux density of the magnetic field, and $\theta$ is the angle between I and B. In accordance with the present invention, the flux density of the magnetic field in which the semiconductor material is placed is varied by a relatively simple expedient of relative rotation between two permanent magnets, thereby to vary the voltage developed across the specimen. By using extremely thin specimens of available semiconductor materials, available magnets, in sizes compatible with microelectronic circuitry, are capable of producing magnetic field strengths which will produce Hall voltages having magnitudes useful in such circuitry. Since the voltage control is obtained by variation in the flux density of the magnetic field, the semiconductor material may be hermetically sealed in a chamber separated from the magnets whereby the magnets may be rotated relative to each other without affecting the seal.

Other objects, features, and advantages of the invention, and a better understanding of its construction and operation, will become apparent from the following detailed description, taken in conjunction with the accompanying drawings, in which.

Briefly reviewing the Hall effect on which the present invention is based, if a current is made to flow through a wafer of semiconductor material in a direction parallel to its long dimension, and a magnetic field is applied in a direction perpendicular to the current flow, a voltage is observed across the sample along the axis normal to both the direction of current flow and the direction of the magnetic field. This is pictorially presented in FIG. 1. The Hall voltage, designated $V_H$, is the result of charge accumulation on the two surfaces of the material. While the magnetic field is building up, a transverse current actually flows in the specimen and the charges accumulate on the two opposite faces, making one side positive and the other negative. The Hall voltage across a sample of semiconductor material of thickness *d* and of rectangular cross-section as illustrated, is given by $$V_H=\frac{RIH\times 10^{-8}}{d}$$

where $V_H$ is in volts, I is in amperes, H is in gauss, *d* is in centimeters, and R is in $cm.^3$/coulomb. The coefficient $10^{-8}$ is included to convert electrostatic units to practical units. It is obvious from this equation that if the physical dimension *d* is decreased, the Hall voltage, for a given magnetic field, will increase, and that the Hall voltage is also proportional to the magnetic field. Thus, by varying the strength of the magnetic field applied to a semiconductor specimen, it is possible to obtain a variation in the Hall voltage.

In accordance with the invention, the variable magnetic field is produced across a specimen of semiconductor material by a pair of cooperating magnets so shaped that one fits over and substantially surrounds the other and arranged for relative rotation between them. The semiconductor specimen is positioned with respect to the magnets so as to be substantially normal to the lines of magnetic flux. When the magnets are turned to a position where like poles are adjacent, the magnetic field across the specimen is at a maximum, and when one magnet is rotated with respect to another to a position where opposite poles are adjacent, essentially no magnetic field is applied to the specimen. Intermediate positions between these two extremes afford controllable levels of magnetic flux in the specimen.

Figure 3:
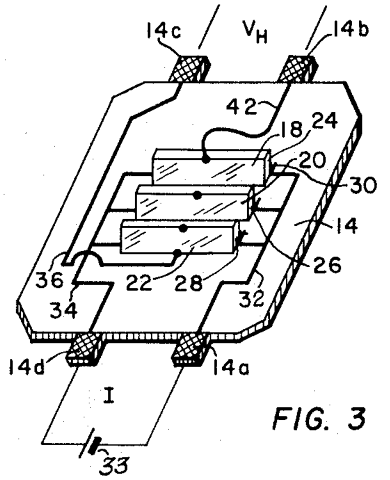
FIG. 3 is an isometric view of the underside of the assembly of FIG. 2.
Figure 2:
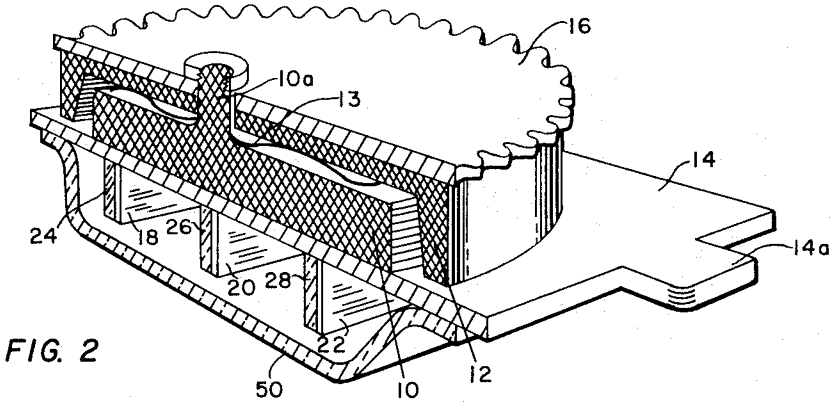
FIG. 2 is an isometric view, partially cut away, of a preferred form of variable voltage generator embodying the invention.

Referring to FIG. 2 where this concept is shown embodied in a structure suitable for incorporation in a microelectronic module, an inner magnet 10 is shown supported on a thin ceramic wafer 14 having tabs projecting from the edges thereof, one of which is shown at 14*a*. Wafer element 14 may be of the form shown in co-pending application S.N. 55,238, filed September 12, 1960, by Messrs. John R. Moore, Gerald J. Selvin and Robert E. Stapleton, entitled "Microelectronic Circuit Modules." The wafer is formed of a rigid insulating material such as a high density, high purity alumina, such as No. AD–99, available from the Coors Manufacturing Company, or Al Si Mag No. 652 or No. 614, available from the American Lava Company. The wafer element is shown greatly enlarged in the drawing, typical dimensions for the element being 0.5″ x 0.5″ with a thickness of 8–12 mils for the module described in the aforesaid application. Wafer 14 may be formed with an equal number of integral tabs projecting from each of the edges of the wafer in the plane of the wafer, so as to correspond with the other wafers of the module described in that application, but may be formed with only four tabs 14*a*, 14*b*, 14*c* and 14*d*, two extending from each of a pair of opposite edges of the wafer as shown in FIG. 3.

Figures 2A, 3A:
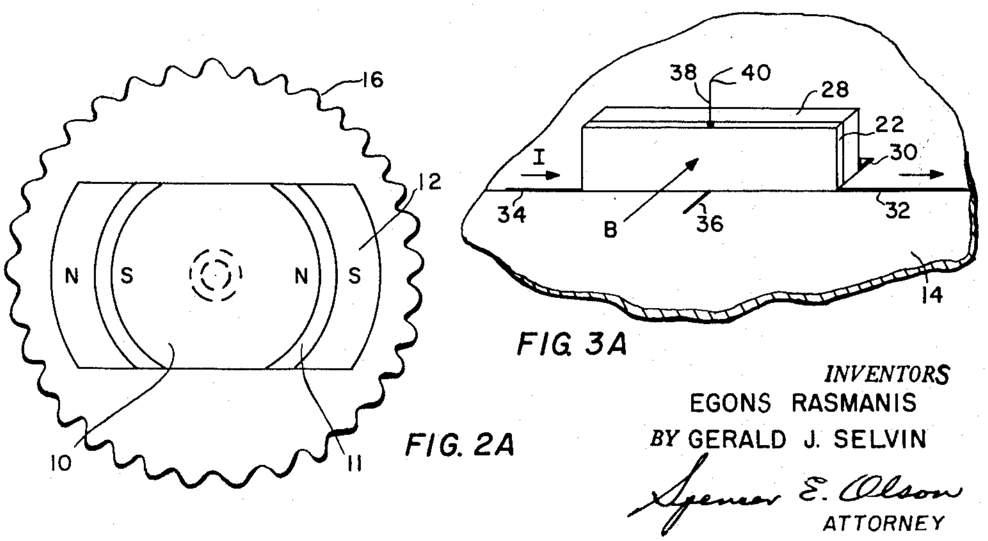
FIG. 2A is a plan view of the underside of the magnet assembly of FIG. 2, with the supporting wafer removed.
FIG. 3A is an enlarged fragmentary view of a portion of FIG. 3.

Magnet 10, preferably formed of Alnico V because of its good temperature stability, is of generally rectangular shape in plan, with a pair of opposite ends curved as shown in FIG. 2A to lie on a circle. In the illustrated embodiment, magnet 10 is secured to the wafer 14, substantially at the center thereof, by fusing or otherwise bonding it to the wafer element. Magnet 12 is essentially U-shaped in cross-section, the channel therein being of circular shape to fit over and around magnet 10 and to be rotatable with respect thereto. As shown in FIG. 2A, the radius of the opening in magnet 12 is slightly greater than the radius of the curved ends of magnet 10 so as to define a narrow gap 11 between the magnets. To facilitate rotation of magnet 12 relative to magnet 10, the latter is formed with an upstanding shaft 10*a*, coaxial with the center of the curved surfaces of magnets 10 and 12, which extends through a central opening in magnet 12 and serves as an axis about which magnet 12 may be rotated. A flat wafer spring 13, or equivalent, is fitted between the upper surface of magnet 10 and the under surface of magnet 12 to provide friction between the two magnets to maintain magnet 12 at the position to which it is rotated regardless of shock and vibration. The depth of the channel in magnet 12 is sufficiently greater than the height of magnet 10 to allow room for spring 13 and provide clearance between magnet 12 and the wafer 14. For convenience in adjusting the position of magnet 12, a circular plate 16 having serrations about its periphery is secured to the upper surface of the magnet. Alternatively, the plate may be dispensed with and the outer periphery of magnet 12 formed with integral serrations.

The semiconductor element, or Hall plate, is secured on the other side of the wafer 14 from the magnets in a position such that the lines of magnetic flux produced by the magnets are substantially normal to the flat surface of the specimen. That is, the element is positioned such that the lines of flux are substantially parallel to the thickness dimension of the specimen. In the embodiment illustrated in FIGS. 2 and 3, three semiconductor elements 18, 20 and 22 are shown attached to the underside of wafer 14, but a single specimen, two specimens, or even a larger number may be used, depending on the voltage desired. Much the same as with a battery, Hall voltage generators may be connected in series to derive a voltage equal to the sum of the voltages generated by the individual elements, or they may be connected in parallel.

The semiconductor material may be selected from several available elements and compounds which exhibit the Hall effect including germanium, silicon indium arsenide, indium antimonide, gallium antimonide, gallium arsenide, indium phosphide, and diamond. From what has been said earlier, if the specimen is made extremely thin, appreciable voltage can be generated with available permanent magnets of small physical size. The semiconductor specimens being very thin, of the order of 0.1 mil or less, they are necessarily supported on a more rigid structure, such as a slab of insulating material, for example, glass or ceramic.

Suitable supporting slabs are shown at 28, 24 and 26 in FIGS. 2 and 3. Sufficiently thin specimens may be made by mounting the semiconductor material on the support and lapping and polishing the material down to the desired thickness. Preliminary experiments have shown that n-type germanium of approximately 10 ohm centimeter resistivity can readily be polished and etched down to a thickness of less than 0.0005″ and that thicknesses of 0.0001″ are feasible with germanium. With the latter thickness and an effective magnetic field of approximately 4000 gauss, voltages of about 10 volts are obtainable. Although a semiconductor specimen is shown supported on only one side of the slabs 24, 26 and 28 it is within the contemplation of the invention to position a specimen or film on each side of each slab.

Figure 4A:
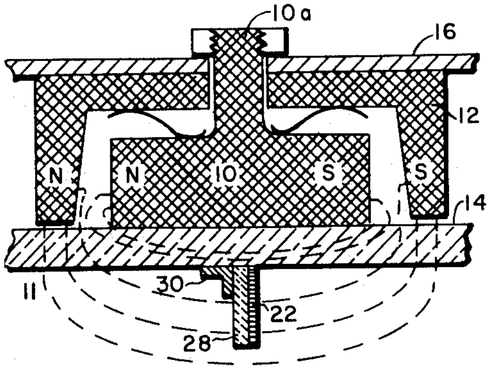
FIGS. 4A and 4B are diagrammatic illustrations of the variable voltage generator of FIG. 2 illustrating how the flux density of the magnetic field is controlled.

The supporting slabs are secured to the under side of the wafer 14 with their length dimension perpendicular to the lines of flux of the field produced by the magnets. The slabs may be secured by firing metallic films onto wafer 14 in the region where it is desired to attach the supporting slabs, and onto the surface of the slab opposite the semiconductor specimen, and welding this slab to the wafer with a metal L-shaped member 30, best seen in FIGS. 4A and 4B. As shown in FIG. 4A with this mounting the magnetic flux passes through the film of semiconductor material 22 in a direction parallel to the thickness dimension of the film. The manner in which the intensity of the magnetic field is varied will be described hereinafter.

The current necessary for producing the Hall effect in the semiconductor specimen is conducted to the specimen through printed wiring on the under surface of ceramic wafer element 14. This current may be supplied from a source external and separate from the voltage generator, or may be supplied by a battery mounted on the wafer when a suitably small battery becomes available. In FIG. 3, the three wafers are shown connected to supply current thereto in parallel from a source external of the generator. As has been suggested, the current source may be a battery mounted in another portion of the module of which the present generator is contemplated as an element, or as a separate component disposed adjacent the module. The terminals of the voltage source, shown diagramamtically at 33 in FIG. 3, are connected to tabs **14*a* and 14*d* on one edge of the wafer, these tabs being covered with a conductive film or coating. As will be more fully described, the remotely positioned current source is preferably connected to the conductive tabs 14*a* and 14*d* by interwiring boards having tab-receiving slots therein into which the tabs 14*a* and 14*d* are inserted. Tab 14*a* is electrically connected in parallel to one end of each of the semiconductor specimens by printed conductor 32 which is bonded, evaporated, fired on, or otherwise affixed to ceramic wafer 14, and conductive tab 14*d* is similarly connected to the other end of the specimen by conductor 34. Printed conductors 32 and 34 may be soldered, welded or otherwise secured in firm electrical contact with current supply terminals secured to the end faces of semiconductor specimen 20**. For proper operation, a current flow through the specimen of approximately one milliampere is required, necessitating a battery or other voltage source having a potential of the order of one to two volts.

Figure 1:
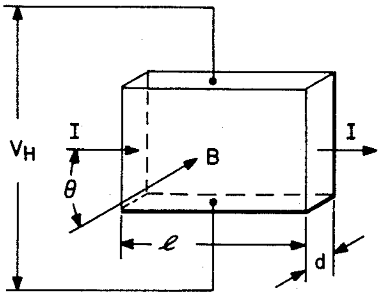
FIG. 1 is a schematic diagram useful in explaining the Hall effect.

As was noted in the consideration of FIG. 1, the Hall voltage is derived across the specimen along the axis normal to both the direction of current flow and the direction of magnetic field. In order to derive the voltage from the specimen mounted as shown in FIGS. 3 and 3A, Hall voltage terminals are secured on opposite edges of the plate equidistant from the ends of the plate. The terminals may be evaporated to the semiconductor material, or thermo-compression bonded, or may be pressure contacts, or probes, firmly contacting the film 22 at the points specified. It is convenient to connect the terminal at the lower edge of the film to a conductor 36 printed on wafer 14, this conductor, in turn, being connected to conductive tab **14*c* projecting from the edge of wafer 14 opposite that to which the current source is connected. If a single semiconductor specimen is used the terminal 38 at its upper edge may be connected with a flexible conductor 40 to a printed conductor 42 on the wafer which is joined to conductive tab 14*b*. If a number of specimens are connected in series, as illustrated in FIG. 3, the terminal on the upper edge of the first is connected to the lower terminal of the second (not shown), the upper terminal of the second is connected to the lower terminal of the third, and finally, the upper terminal of the third is connected to printed conductor 42 and thence to conductive tab 14*b*. Thus, the Hall voltage, $V_H$, is produced across tabs 14*c* and 14*b* and may be applied to circuitry on other wafers in the module via a second interwiring board having slots for receiving tabs 14*c* and 14*b*** and wiring thereon for selective connection of these tabs to circuitry on other wafer elements.

Figure 4B:
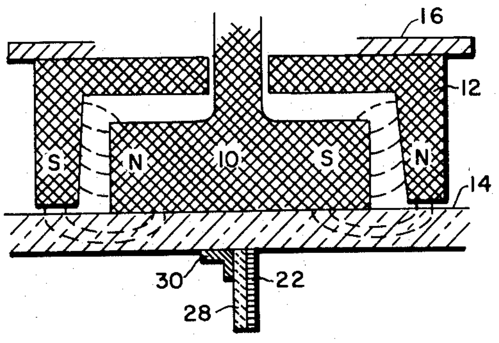

Referring now to FIGS. 4A and 4B, the magnetic field of variable intensity is produced by the two magnets 10 and 12, with magnet 12 placed over and around magnet

10 and rotatable with respect thereto. When magnet 12 is turned to the position where its north and south poles are respectively adjacent the north and south poles of magnet 10, as shown in FIG. 4A, the magnetic flux lines extend through the ceramic wafer 14 and pass through the semiconductor wafer in a direction substantially parallel to the thickness dimension of the specimen. This relative orientation of the magnets also produces maximum field strength in the vicinity of the specimen. When the magnet 12 is rotated through 180 degrees to the position shown in 4B, with opposite poles of the magnets adjacent each other, the lines of flux extend along short paths across the field gaps between the opposite poles with the consequence that no field is applied to the specimen. In this case, no Hall voltage is generated. Intermediate positions of magnet 12, between that shown in FIG. 4A and that shown in FIG. 4B, provide magnetic flux intensities of controllable level. Consequently, with constant current flowing through the specimen, the Hall voltage generated by the specimen is proportional to the relative orientation of magnets 10 and 12.

Figure 5:
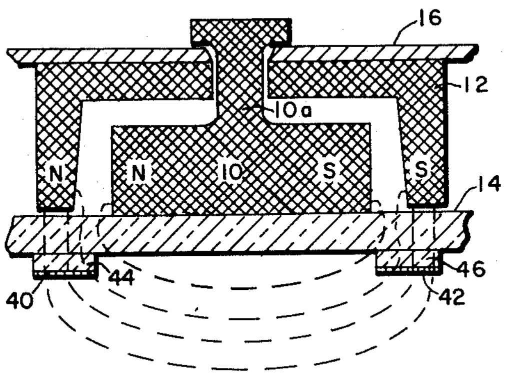
FIG. 5 is a diagrammatic cross-sectional view of the voltage generator of FIG. 2 illustrating an alternative construction.

While the specimen is shown in a position perpendicular to the wafer 14 and equidistant the ends of magnet 10, it will be evident that there are other locations and positions of the specimen where the lines of flux are normal to the specimen. For example, as shown in FIG. 5, Hall plates 40 and 42 may be supported on slabs 44 and 46, respectively, and positioned in a plane parallel to the surfaces of wafer 14. When like poles of the two magnets are adjacent to each other, as shown in FIG. 5, the lines of flux are substantially normal to the wafer as shown, and of maximum intensity. However, when opposite poles are adjacent, as will be observed from FIG. 4B, such flux as does pass through the specimen is essentially parallel to the surface of the specimen with the result that little or no Hall voltage is generated. At intermediate relative positions of the two magnets, the flux is at different levels of intensity resulting in a variation in the magnitude of the generated Hall voltage.

Referring again to FIG. 2, to insure stability of the extremely thin films of semiconductor material they are preferably hermetically sealed from their surrounding environment. To this end, the semiconductor specimens and their supporting slabs are hermetically sealed by a cup-shaped cover or "hat" 50 placed over the specimens, and sealed at its periphery to wafer 14. It is to be noted that the conductors 32, 34, 36 and 42 (FIG. 3) must be brought through a perimetral seal to make connection with their corresponding conductive tabs. The cover may be formed of glass and joined to the ceramic wafer by a glass-to-glass-ceramic seal, or may be made of metal and joined to the wafer by a metal-to-metal-to-glass-to-ceramic seal. In either case, provision is made for bringing conductors on the wafer through the hermetic seal for connection to the conductive tabs. During the sealing process, an inert atmosphere may be introduced inside the cover should this be necessary for stability of the semiconductor specimens. Suitable seals for this purpose, and methods for fabricating the same, are described in detail in co-pending application S.N. 55,238, filed September 12, 1960, by Messrs. J. R. Moore, G. J. Selvin and R. E. Stapleton, entitled "Microelectronic Circuit Modules," and assigned to the assignee of the present application. With the specimens thus sealed to the underside of wafer 14, it will be apparent that rotation of magnet 12 about magnet 10 on the other side of the wafer does not disturb the hermetic seal in any way. Consequently, manual adjustment of the voltage source is possible from a point externally of the generator without expensive or troublesome sealing of shafts or the like.

While the disclosed voltage generator has general applicability, it is particularly useful in micro-miniaturized modules of the type disclosed in co-pending application S.N. 796,577, filed March 2, 1959, by Gerald J. Selvin, now Patent No. 2,999,686, and assigned to the assignee of the present application, and in modules of the type disclosed in the aforementioned co-pending application S.N. 55,238. The modules described in these applications comprise a plurality of thin wafers, preferably formed of ceramic material, on which circuit elements or sub-circuits are applied, as by printing or evaporation techniques, or by physical attachment. The wafers are all of the same size and shape, preferably square, and each is provided on each of its edges with the same number of integral tabs. The terminals of the circuit elements on a wafer are conductively connected to selected ones of the tabs on the wafer, the selected tabs being rendered conductive, as by coating with a suitable metal. A group of wafers, having the necessary circuit elements thereon to form, when connected, a required circuit, are stacked one on the other with the active conductive tabs innerconnected by an insulating interwiring board, also formed of ceramic, which engages and makes electrical contact with the projecting tabs. The interwiring board is formed with a plurality of slots spaced to receive the tabs extending from one edge of the stack, with selected slots interconnected with printed wiring to interconnect the active tabs on the wafers. Depending upon the nature of the circuit constituted by the module, one or more up to four separate interwiring boards may be required to make the necessary interelement connections. Thus the stacked wafers and their associated interwiring boards provide a rugged, rigid module of high component density.

Figure 6:
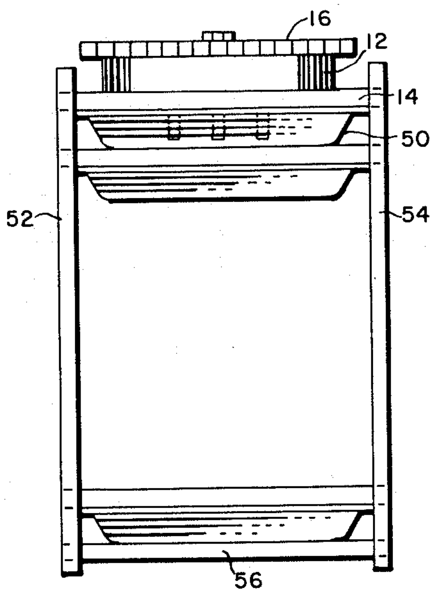
FIG. 6 is an elevation view of a microelectronic circuit module incorporating the present voltage generator.

Referring to FIG. 6, the appropriate wafers to constitute a circuit are stacked into a module with the tabs on the wafers projecting into slots formed in the interwiring boards, two of which are shown at 52 and 54. The tab-receiving slots in the boards 52 and 54 are accurately spaced to support one wafer substantially in contact with the surface of the "hat" on the immediately adjacent wafer. In order to have access externally of the module to permit rotation of magnet 12, the wafer on which the generator is supported preferably constitutes on end closure of the module, and it may be desirable, as protection for the "hat" on the lower wafer to provide an end closure consisting of a blank wafer element 56. The interwiring boards 52 and 54 may be of the construction described in the aforementioned Selvin application S.N. 796,577. The boards are formed of the same material as the wafers, with those slots to which connection is to be made to an active tab surrounded by conductive material, and the slots interconnected by printed wiring fired or otherwise affixed to the surface of the boards. Preferably four interwiring boards are used so as to completely enclose the wafers, but a sufficiently rigid module can be fabricated with two interwiring boards. It will be understood that additional wafers would be stacked in the region between end closure 56 and the generator; these have been omitted for purposes of clarity.

From the foregoing it is apparent that applicants have provided a variable voltage generator wherein the sensitive electronic material is hermetically sealed, with the necessary conductors connected therewith brought through the seal for external connection, and with adjustment possible by externally accessible means without disturbing the seal. The generator is extremely small, and may be conveniently assembled with additional wafer elements carrying electronic components or sub-systems to produce a microelectronic module.

While there has been described and shown that are now considered to be preferred embodiments of the invention, various modifications may be made without departing from the true spirit thereof. Other semiconductor materials than those enumerated might be used without departing from the spirit of the invention, and, of course, magnet 12 may be rigidly positioned on wafer 14 and magnet 10 rotated with respect thereto to obtain a magnetic flux of variable intensity. Also, as has been suggested, should a sufficiently small battery capable of supplying the current requirements of the Hall generator become available, it is contemplated that it might be positioned within the sealing "hat" 50 with connections made directly from the terminals of the battery to the semiconductor specimens, thus eliminating the need for the printed conductors 32 and 34 connected to conductive tabs 14a and 14b. Therefore, it is intended that the invention not be limited by what is shown and described, except as such limitations occur in the appended claims.

What is claimed is:

1. A variable voltage generator comprising, in combination, first and second permanent magnets, said second magnet substantially surrounding said first magnet and rotatable with respect thereto to provide a magnetic field of maximum intensity when like poles of said first and second magnets are adjacent and of minimum intensity when opposite poles of said first and second magnets are adjacent, a semiconductor wafer disposed in said magnetic field substantially normal to the lines of magnetic flux when said magnetic field is of maximum intensity and having current supply terminals and Hall electrodes to provide an output voltage proportional to the product of the current in said semiconductor and the intensity of said magnetic field, and means for rotating said second magnet relative to said first magnet for varying the intensity of said magnetic field.

2. A variable voltage generator comprising, in combination, a supporting plate formed of non-magnetic material, first and second permanent magnets supported on one surface of said plate, said second magnet substantially surrounding said first magnet and axially rotatable with respect thereto to provide a magnetic field of maximum intensity when like poles of said first and second magnets are adjacent and of minimum intensity when opposite poles of said first and second magnets are adjacent, a semiconductor element secured to the other surface of said plate and disposed in said magnetic field substantially normal to the lines of magnetic flux when said magnetic field is of maximum intensity and having current supply terminals and Hall electrodes to provide an output voltage proportional to the product of the current in said semiconductor element and the intensity of said magnetic field, and means for rotating said magnets relative to each other for varying the intensity of said magnetic field.

3. A variable voltage generator comprising, in combination, a flat supporting plate formed of nonmagnetic material, a first permanent magnet secured to one surface of said support plate, a second permanent magnet of U-shaped cross-section substantially surrounding said first magnet and rotatable with respect thereto to provide a magnetic field of maximum intensity when like poles of said first and second magnets are adjacent and of minimum intensity when opposite poles of said first and second magnets are adjacent, a semiconductor element secured to the other surface of said support plate and oriented in said magnetic field substantially normal to the line of magnetic flux when said magnetic field is of maximum intensity and having current supply terminals and Hall electrodes to provide an output voltage proportional to the product of the current in said semiconductor element and the intensity of said magnetic fields, an enclosure around said semiconductor element hermetically sealed to said support plate, and means for rotating said second magnet relative to said first magnet for varying the intensity of said magnetic field.

4. A Hall voltage generator for producing a variable output voltage comprising, in combination, a flat support member formed of non-magnetic material, a first permanent bar magnet having curved ends secured to one surface of said support member, a second permanent magnet of U-shaped cross-section positioned over and substantially surrounding said first magnet and defining therewith a pair of field gaps, the sides of the channel in said second magnet being curved similarly to the ends of said first magnet to be rotatable with respect to said first magnet to provide a magnetic field of maximum intensity between said field gaps when like poles of said first and second magnets are adjacent and of minimum intensity when opposite poles of said first and second magnets are adjacent, a semiconductor element secured to the other surface of said support member and disposed in said magnetic field substantially normal to the lines of magnetic flux when said magnetic field is of maximum intensity and having current supply terminals and Hall electrodes to provide an output voltage proportional to the product of the current in said semiconductor element and the intensity of said magnetic field, a cup-shaped enclosure of non-magnetic material positioned over said semiconductor element and hermetically sealed to said other surface of said support member, and means accessible from outside the generator for rotating said second magnet relative to said first magnet for varying the intensity of said magnetic field.

5. A variable Hall voltage generator for use in a microelectronic circuit module comprising, in combination, a cermaic wafer having tabs projecting from at least one edge thereof, a first permanent magnet secured to one surface of said wafer, a second permanent magnet of U-shaped cross-section positioned over and substantially surrounding said first magnet and defining therewith a pair of field gaps, said second magnet being rotatable with respect to said first magnet to provide a magnetic field between said gaps of maximum intensity when like poles of said first and second magnets are adjacent and of minimum intensity when opposite poles of said first and second magnets are adjacent, a semiconductor element secured to the other surface of said wafer and disposed in said magnetic field substantially normal to the lines of magnetic flux when said magnetic field is of maximum intensity and having current supply terminals and Hall electrodes to provide an output voltage proportional to the product of the current in said element and the intensity of said magnetic field, electrical conductors secured to said other surface of said wafer connecting said Hall electrodes to a pair of said tabs, a cup-shaped enclosure of non-magnetic material positioned over said semiconductor element and said conductors and hermetically sealed to said wafer, and means accessible from outside the generator for rotating said second magnet relative to said first magnet for varying the intensity of said magnetic field.

6. A variable Hall voltage generator for use in a microelectronic circuit module comprising, in combination, a ceramic wafer having tabs projecting from at least one edge thereof, a first permanent bar magnet having curved ends lying on a first circle secured to one surface of said wafer, a second permanent magnet of U-shaped cross-section, the sides of the channel in said second magnet lying on a circle slightly larger than said first circle, said second magnet being positioned over and substantially surrounding said first magnet and defining therewith a pair of field gaps, said second magnet being axially rotatable with respect to said first magnet to provide a magnetic field between said gaps of maximum intensity when like poles of said first and second magnets are adjacent and of minimum intensity when opposite poles of said first and second magnets are adjacent, a thin film of semiconductor material supported on the other surface of said wafer and disposed in said magnetic field substantially normal to the lines of magnetic flux when said magnetic field is of maximum intensity and having current supply terminals and Hall electrodes to provide an output voltage proportional to the product of the current in said film and the intensity of said magnetic field, electrical conductors secured to said other surface of said wafer connecting said Hall electrodes to a pair of said tabs, a cup-shaped enclosure of non-magnetic material positioned over said film of semiconductor material and said conductors and hermetically sealed to said wafer, and means accessible from outside said generator for rotating said second magnet relative to said first magnet for varying the intensity of said magnetic field.

7. A variable voltage generator comprising, in combination, first and second permanent magnets, said second magnet substantially surrounding said first magnet and rotatable with respect thereto to provide a magnetic field of maximum intensity when like poles of said first and second magnets are adjacent and of minimum intensity when opposite poles of said first and second magnets are adjacent, a semiconductor wafer disposed in said magnetic field substantially normal to the lines of magnetic flux when said magnetic field is of maximum intensity and having current supply terminals and Hall electrodes to provide an output voltage proportional to the product of the current in said semiconductor and the intensity of said magnetic field, and means for rotating said magnets relative to each other for varying the intensity of said magnetic field.

8. A variable voltage generator comprising, in combination, first and second permanent magnets, said second magnet substantially surrounding said first magnet and rotatable with respect thereto to provide a magnetic field of maximum intensity when like poles of said first and second magnets are adjacent and at minimum intensity when opposite poles of said first and second magnets are adjacent, a semiconductor wafer disposed in said magnetic field substantially normal to the lines of magnetic flux when said magnetic field is of maximum intensity and having current supply terminals and Hall electrodes to provide an output voltage proportional to the product of the current in said semiconductor and the intensity of said magnetic field, and means for adjusting the polar position of said magnets relative to each other for varying the intensity of said magnetic field.

9. A variable voltage generator comprising, in combination, first and second permanent magnets, said second magnet substantially surrounding said first magnet and rotatable with respect thereto to provide a magnetic field of maximum intensity when like poles of said first and second magnets are adjacent and of minimum intensity when opposite poles of said first and second magnets are adjacent, a semiconductor wafer disposed in said magnetic field substantially normal to the lines of magnetic flux when said magnetic field is of maximum intensity and having current supply terminals and Hall electrodes to provide an output voltage proportional to the product of the current in said semiconductor and the intensity of said magnetic field, and means accessible from outside the generator for rotating said magnets relative to each other for varying the intensity of said magnetic field.

10. A variable voltage generator comprising, in combination, a supporting plate formed of non-magnetic material, first and second permanent magnets supported on one surface of said plate, said second magnet substantially surrounding said first magnet and axially rotatable with respect thereto to provide a magnetic field of maximum intensity when like poles of said first and second magnets are adjacent and of minimum intensity when opposite poles of said first and second magnets are adjacent, a semiconductor element secured to the other surface of said plate and disposed in said magnetic field substantially normal to the lines of magnetic flux when said magnetic field is of maximum intensity and having current supply terminals and Hall electrodes to provide an output voltage proportional to the product of the current in said semiconductor element and the intensity of said magnetic field, and means accessible from outside the generator for adjusting the polar position of said magnets relative to each other for varying the intensity of said magnetic field.

11. A variable voltage generator comprising in combination, a supporting plate formed of non-magnetic material, first and second permanent magnets supported on one flat surface of said plate and arranged to provide a magnetic field the intensity of which may be varied upon adjustment of the positions of said magnets relative to each other, and a semi-conductor element secured to the other flat surface of said plate and disposed in said magnetic field substantially normal to the lines of magnetic flux when said magnetic field is of maximum intensity, said semiconductor element having current supply electrodes and Hall electrodes to provide an output voltage proportional to the product of the current in said semiconductor element and the intensity of said magnetic field.

References Cited in the file of this patent

UNITED STATES PATENTS

| | | |
|---|---|---|
| 2,512,325 | Hansen | June 20, 1950 |
| 2,536,805 | Hansen | Jan. 2, 1951 |
| 2,906,945 | Weiss | Sept. 29, 1959 |
| 2,945,993 | Kuhrt | July 19, 1960 |
| 3,077,548 | Moressee et al. | Feb. 12, 1963 |